United States Patent
Birk et al.

(10) Patent No.: US 8,499,717 B2
(45) Date of Patent: Aug. 6, 2013

(54) ROTARY PARLOUR WITH DELIVERY LINES

(75) Inventors: Uzi Birk, Huddinge (SE); Björn Johansson, Södertälje (SE)

(73) Assignee: DeLaval Holding AB, Tumba (SE)

( * ) Notice: Subject to any disclaimer, the term of this patent is extended or adjusted under 35 U.S.C. 154(b) by 1535 days.

(21) Appl. No.: 11/570,578

(22) PCT Filed: May 16, 2005

(86) PCT No.: PCT/SE2005/000709
§ 371 (c)(1),
(2), (4) Date: May 8, 2007

(87) PCT Pub. No.: WO2005/120220
PCT Pub. Date: Dec. 22, 2005

(65) Prior Publication Data
US 2008/0035063 A1  Feb. 14, 2008

(30) Foreign Application Priority Data

Jun. 14, 2004  (SE) ...................................... 0401513

(51) Int. Cl.
*A01J 5/00* (2006.01)
(52) U.S. Cl.
USPC .................. 119/14.04; 119/14.03; 119/14.14
(58) Field of Classification Search
USPC ...................... 119/14.03, 14.04, 14.46, 14.14
See application file for complete search history.

(56) References Cited

U.S. PATENT DOCUMENTS

| | | | |
|---|---|---|---|
| 1,959,716 A | | 5/1934 | Hapgood |
| 2,305,259 A | | 12/1942 | Jeffers, Sr. |
| 3,709,196 A | | 1/1973 | Hicks |
| 3,999,517 A | | 12/1976 | Andersson |
| 4,098,526 A | | 7/1978 | DuBois |
| 4,344,385 A | * | 8/1982 | Swanson et al. ............ 119/14.08 |
| 4,508,058 A | * | 4/1985 | Jakobson et al. ........... 119/14.02 |
| 5,664,521 A | * | 9/1997 | Simpson et al. ............ 119/14.02 |
| 6,073,580 A | * | 6/2000 | Graupner et al. ........... 119/14.08 |
| 6,725,803 B2 | * | 4/2004 | Van der Lingen et al. . 119/14.02 |
| 2003/0150392 A1 | | 8/2003 | Sundborger |

FOREIGN PATENT DOCUMENTS

| | | |
|---|---|---|
| EP | 0 699 024 B1 | 3/1996 |
| EP | 0880888 A2 | 12/1998 |
| GB | 1175588 | 12/1969 |
| SU | 762814 | 9/1980 |
| WO | WO 99/51083 | 10/1999 |
| WO | 0074472 A1 | 12/2000 |
| WO | WO 01/35728 A1 | 5/2001 |
| WO | WO 03/098998 A1 | 12/2003 |

* cited by examiner

*Primary Examiner* — Kristen C Hayes
(74) *Attorney, Agent, or Firm* — Hovey Williams LLP

(57) ABSTRACT

A portable apparatus (1) for milking of animals (11-16) which are permitted to go loose is described. The apparatus (1) comprises a plurality of stalls (2) with at least one local milk tank (4) in each stall. The apparatus (1) comprises at least two separate lines (19, 20) arranged to receive the milk from the local milk tanks (4) in dependence of the quality of the milk.

15 Claims, 4 Drawing Sheets

ROTARY PARLOUR WITH DELIVERY LINES

Applicant hereby incorporates by reference International Application PCT/SE2005/000709, filed 16 May 2005, claiming priority from Swedish Application No. SE 0401513-7 filed 14 Jun. 2004 (also incorporated by reference herein).

TECHNICAL FIELD

The present invention relates to a rotary parlour with at least two delivery lines for the milk.

DESCRIPTION OF THE PRIOR ART

Milking stations have been used for a number of years in order to milk cows which are allowed to go loose and find their way to the milk stations. In order to reduce the manual work involved with manual milking, robots have been used to perform the manual work in the milking operation. There are a number of different types of milking stations of which one type is the rotary parlour in which a number of animal boxes are arranged in an annular arrangement.

An example of a rotary parlour is described in U.S. Pat. No. 4,508,058. In this patent a rotary parlour is described, wherein a stationary robot is arranged to attach teatcups on an animal when the animal box with the animal is in front of the stationary robot.

Another example of a rotary parlour is described in the PCT application WO 00/74472. The rotary parlour comprises a number of milking positions each comprising a local milk tank with an exit pipe. The milk from the cow that is being milked is collected in the local milk tank in the milking position. A central milk tank is connected to a funnel for collection of milk from each one of the local milk tanks in the milking positions. The local milk tank in each milking position can be emptied only when the exit pipe of the local milk tank is above the funnel of the central milk tank. This is the case once per revolution of the rotary parlour. After having entered the funnel the milk is transferred to a collection vessel in which the quality of the milk is determined. The milk is then transferred to different tanks depending on the quality of the milk.

SUMMARY OF THE INVENTION

An object of the present invention is to provide an apparatus for milking with a plurality of stalls which are annularly arranged in a rotatable arrangement, which apparatus is an alternative to the prior art apparatuses for milking.

Another object of the present invention is to provide an apparatus for milking with a plurality of stalls which are annularly arranged in a rotatable arrangement, which apparatus is more easily cleaned, after milk of poor quality has been milked from an animal, than the prior apparatuses for milking.

A further object of the present invention is to provide an apparatus for milking with a plurality of stalls which are annularly arranged in a rotatable arrangement, which apparatus provides for easy handling or disposal of milk of poor quality.

These objects are achieved with an apparatus for milking according to the independent claim. Further advantages are achieved with an apparatus comprising the features of the dependent claims.

An apparatus according to the present invention for milking of animals which are permitted to go loose, comprises a plurality of stalls, in which the animals are to be milked, which stalls are annularly arranged in a rotatable arrangement. Each stall comprises teatcups to be applied to the teats of an animal present in the stall, and at least one local milk tank connected to the teatcups via a respective milk conduit. The apparatus is characterised in that it comprises a testing device arranged to test the quality of the milk to be contained in each local milk tank, and that the apparatus comprises at least two separate lines arranged to receive the milk from the local milk tanks, wherein each local milk tank is arrangable for transfer of the milk to one of the lines in dependence of the quality of the milk.

An apparatus according to the present invention provides for more easy cleaning, after milk that is not of good quality has been milked, compared with apparatuses according to the prior art. By having a separate line for milk that is not of good quality and milk of good quality and by performing the testing in the local tank it is in principal only the local tank that has to be cleaned in case milk of low quality has been milked.

In this context good quality means that the milk fulfils governmental regulations for milk to be consumed by people.

The testing device is preferably arranged to measure the quality of the milk within the local milk tanks, but may also be arranged to measure the quality of the milk on the way from the teatcups to the local milk tank.

Each local milk tank may have at least one outlet provided with at least one outlet valve, wherein each one of the separate lines has an opening for receiving milk from the outlet, and wherein the apparatus is arranged to position the outlet from a local milk tank at one of the openings when milk is to be transferred from the local milk tank.

An apparatus having the lines arranged in this way provides for a low cost for the installation as the lines only has to have an opening arranged at one location.

The outlet from each local milk tank may be movable in relation to the local milk tank to choose to which one of the openings the milk is to be transferred. By having only one outlet from the local milk tank only one outlet valve has to be provided, which lowers the cost of the apparatus. By having the outlet from the local milk tank movable in relation to the local milk tank the positioning of the outlet during rotation of the stalls may be less accurate as small adjustments of the position of the outlet then may be made after rotation of the stalls has stopped.

Alternatively the openings may be movable to choose to which one of the openings the milk is to be transferred.

Each one of the separate lines may have an opening for receiving milk and each local milk tank may have an outlet with a valve corresponding to each one of the openings. The apparatus may then be arranged to position the outlets from each local milk tank at the corresponding openings, when milk is to be transferred from the local milk tank, and to open the valve corresponding to the opening to which the milk is to be transferred. Alternatively, the openings of the lines may be movable.

This is an alternative solution to having a movable outlet from the local tank.

At least a first line of the lines may be connected to all of the local milk tanks with a connection valve between the local milk tank and the first line, wherein the local milk tank may be arrangable for transfer of the milk to the first line by opening the connection valve between the local milk tank and the first line.

By having at least one of the lines connected to all the local milk tanks with a valve it is possible to transfer the milk of the corresponding quality from the local milk tank at any time.

There are many alternatives for arranging all the local milk tanks in connection with at least one of the lines. Said at least one of the lines may be an annular line which extends to the vicinity of all the stalls. By having said at least one of the lines arranged in this way it is possible to connect the local milk tanks to the line with short conduits between the local milk tanks and the line.

In case one of the lines is connected to all the local milk tanks it might be advantageous to connect all the lines to all of the local milk tanks. In this way a maximum degree of freedom is achieved for the transfer of milk from the local milk tanks to the lines, which transfer may occur at any time for any quality of the milk.

In an apparatus according to the invention a sampling device may be arranged to take a sample of the milk from each local milk tank as it enters one of the lines, wherein the sample is representative of the milk in the local milk tank. This sample may then be sent to a laboratory for measurements of fat and protein contents.

The sampling device may be of many different forms and may comprise a collection device which may be positioned in the flow of milk from the local milk tank as the milk from the local milk tank is transferred to one of the lines. This is an approach for collecting a sample of milk which is representative for the milk in the local milk tank.

In an apparatus according to the invention a robot may be arranged to position the teatcups on the animals in the stalls. Alternatively, the apparatus is arranged for manual application of the teatcups on the animals.

A further robot may also be arranged for application on the teatcups of the animals. This further robot may arrange the teatcups on the animals in case of any problems with the first robot.

It goes without saying that the different features described above may be combined in the same embodiment. In the following, different embodiments of the invention will be described with reference to the drawings.

DESCRIPTION OF EMBODIMENTS OF THE INVENTION

Figure 1:
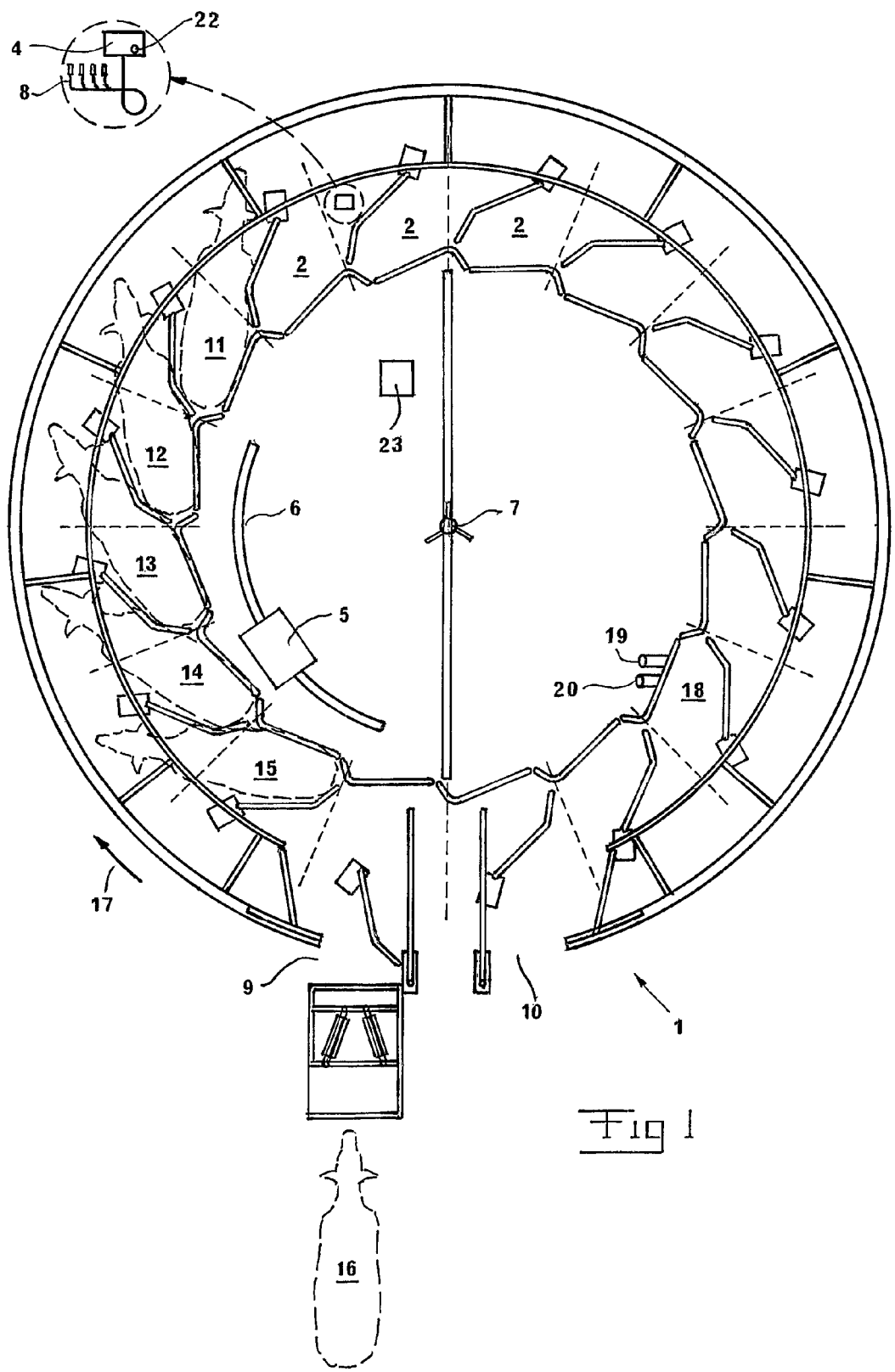
FIG. 1 shows schematically an apparatus, according to a first embodiment of the present invention, arranged for milking cows.

In the description below the animals will be described as cows, while it is appreciated that also other animals may be milked with the apparatus according to the described embodiments. In the description below the same reference numerals will be used for similar features in all of the figures.

FIG. 1 shows schematically an apparatus 1 according to a first embodiment of the present invention, which apparatus 1 is arranged for milking cows. The apparatus have a number of stalls 2 for cows to be milked, which stalls are annularly arranged around a rotational axis 7. In the figure there is shown a first cow 11, a second cow 12, a third cow 13, a fourth cow 14, a fifth cow 15 and a sixth cow 16. A robot 5 is arranged between the stalls 2 and the rotational axis 4. The robot 5 is movable along a rail 6, which defines an arc. A local milk tank 4 is arranged in each one of the stalls 2. There are also arranged teatcups 8 in each stall, which teatcups 8 are connected to the local milk tank 4 in the stall. In the figure the teatcups 8 and the local milk tank 4 is shown only in one of the stalls 2. The robot 5 is arranged to arrange the teatcups 8 on the cows 3 in the stalls 2. Working vacuum and pulsation vacuum are applied to the teatcups 8 as is known from the art to effect milking of the cows 3.

The apparatus has an entrance gate 9 and an exit gate 10. Furthermore, the apparatus 1 has a testing device for testing the milk in each one of the local milk tanks 4, a first line 19 for receiving milk of good quality and a second line 20 for receiving milk of poor quality. The testing device comprises a sensor 22 in each one of the local milk tanks 4. The sensor 22 is arranged to measure the quality of the milk by measuring the conductivity of the milk in the local milk tanks 4. The apparatus 1 also comprises a computer 23 which forms part of the testing device and which controls the rotation of the stalls 2, the robot 5 and the milking of the cows 3.

The testing device may alternatively be arranged to test the quality of the milk on its way from the teatcups 8 to the local milk tank 4.

The testing device does not have to comprise a sensor but may test the milk in other ways. The testing device may be arranged to use a camera to count the somatic cells in the milk. Alternatively the testing device may be arranged to let the milk react with a substance and to observe if there is any reaction which may indicate that the milk is of poor quality.

Thus, as stated above the testing device is partly implemented as a part of the computer 23. The testing device may according to another embodiment comprise a local computer at each local milk tank.

In operation each one of the cows 11-16 enters the apparatus through the entrance gate 9. After the fifth cow 15 has entered its stall 2 the stalls 2 are rotated, controlled by the computer 23, in the clockwise direction, as is indicated by the arrow 17, to allow the sixth cow 16 to enter a stall 2. The computer 23 then controls the robot 5 to start applying the teatcups 8 on the cows 11-16 in the position of the third cow 13, the fourth cow 14 or the fifth cow 15 in the figure. The robot 5 may then follow the cow during rotation of the stalls 2 by movement of the robot 5 along the rail 6. In case there are problems with the application of the teatcups 8 on the cows 11-16 the robot 5 may follow the cows 11-16 all the way to the position of the second cow 12. After application of the teatcups 8 on the cows 11-16 milking is commenced by applying the working vacuum and the pulsation vacuum on the teatcups 8. The appliance of these vacuums is known from the art and will not be described in detail here. During the milking the milk is transferred to the local milk tank 4. After milking has been finished the teatcups 8 are removed from the cows 11-16 and the quality of the milk in the local milk tank 4 is measured with the testing device being comprised of the sensor 22 and the computer 23. When the stall is in the position of the stall denoted 18, the milk is transferred from the local milk tank 4 to the first line 19 or the second line 20 as will be described in more detail in relation to FIG. 2 below.

Figure 2:
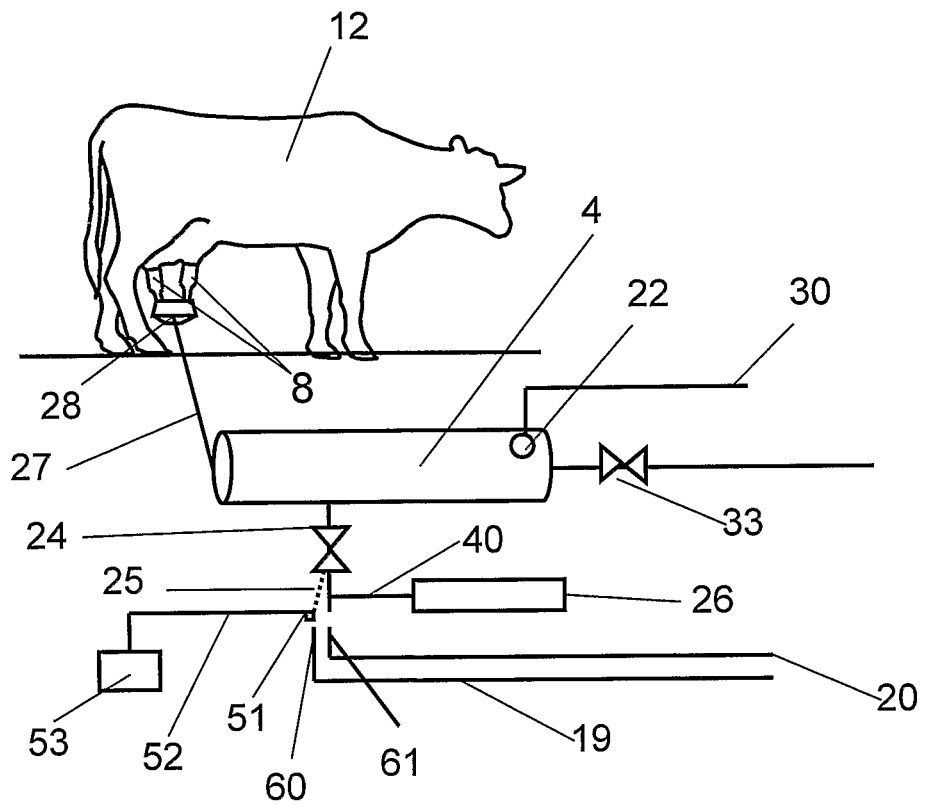
FIG. 2 shows in more detail a side view of one of the stalls in the apparatus in FIG. 1, when it is positioned for transfer of milk from the local milk tank to one of the lines.

FIG. 2 shows schematically a side view of one of the stalls 2 in the apparatus 1 in FIG. 1, when the stall 2 is positioned for transfer of milk from the local milk tank 4 through an outlet 25 to the opening 60 of the first line 19 or to the opening 61 of the second line 20. As shown in the figure the teatcups 8 are connected to a claw 28 which is connected to the local milk tank with a conduit 27. A first outlet valve 24 is arranged before the first outlet 25 to control the flow of milk from the local milk tank 4. A translation device in the form of a cylinder 26 with a piston 40 is arranged for moving the outlet 25 to be over the opening 60 of the first line 19, as shown by the dotted line, or over the opening 61 of the second line 20. The piston 40 is driven in the cylinder 26 with, e.g., compressed air. In FIG. 2 the piston 40 has positioned the outlet above the opening 61 of the second line 20. The first line 19 may be connected to a central milk tank not shown in the figure, while the second line 20 may be connected to a drain, not shown in the figure, or to a separate tank, not shown in the figure. A sensor 22 is arranged in the local milk tank 4 to test the quality of the milk. Such a milking sensor 22 is placed also in all the other local milk tanks 4. The sensors 22 are connected to the computer 23 via a sensor line 30. The sensors 22 form a testing device together with the computer 23. The lines for the pulsation vacuum are not shown in FIG. 2 in order to make the figure clearer. Working vacuum is applied to the tank via a vacuum valve 33. A sampling device 50 is arranged in the apparatus 1 with a collection device 51 arranged at the outlet 25. The collection device 51 is connected with a sampling conduit 52 to a sample device 53. Sample devices are known from the art and will not be described in detail here. The function of the sample device 53 is to arrange samples from different cows. The collection device 51 will be further described in relation to FIG. 7 below. The collection device 51 may be arranged movable in relation to the outlet 25 or may be fixed in relation to the outlet 25.

In operation, when the cow is milked the vacuum valve 33 is opened and milk from the teats is transferred to the claw 28 and through the conduit 27 to the local milk tank 4. After or during milking the quality of the milk in the local milk tank 4 is measured with the computer 23 and the sensor 22. In case the quality of the milk is good the computer controls the piston 40 to position the outlet 25 at the opening 60 of the first line 19, while if the quality of the milk is not good the computer 23 controls the piston 26 to position the outlet 25 at the opening 61 of the second line 20. After the outlet 25 has been positioned the computer 23 controls the opening of the outlet valve 24 to allow the milk in the local milk tank 4 to be emptied in one of the first line 19 and the second line 20.

Figure 3:
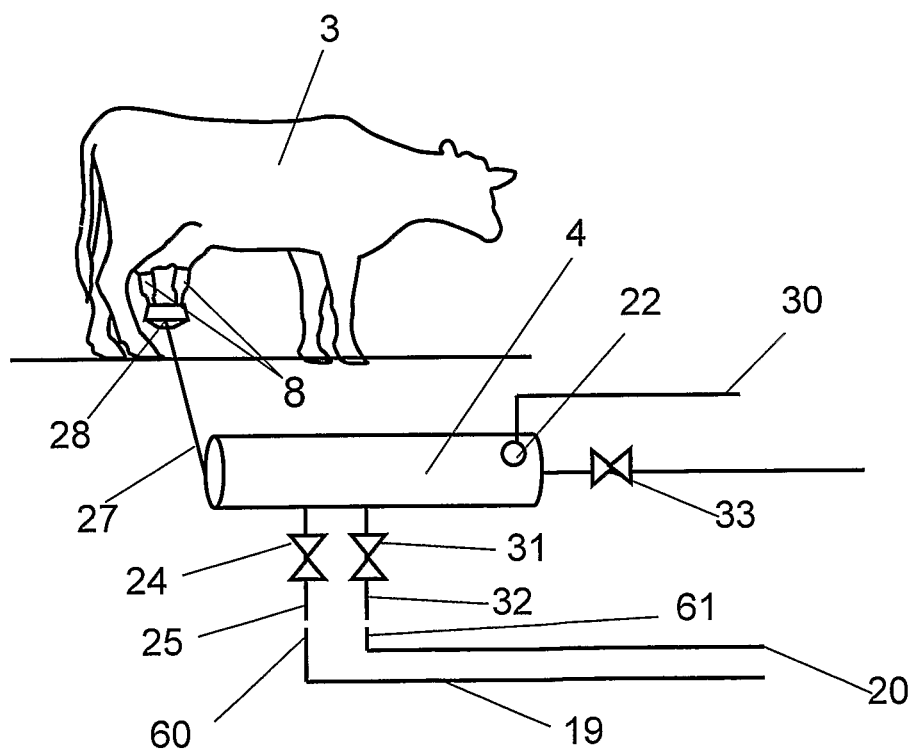
FIG. 3 shows a side view of a stall according to another embodiment of the present invention when the stall is positioned for transfer of milk from the local milk tank.

FIG. 3 shows schematically a side view of a stall 2 according to a second embodiment of the present invention, which stall may be arranged in an apparatus according to FIG. 1. Only the parts in this embodiment that differ from the parts in the embodiment in FIG. 2 will be described. In FIG. 3 a first outlet valve 24 and a second outlet valve 31 are arranged on a first outlet 25 and a second outlet 32, respectively. In FIG. 3 the opening 60 of the first line 19 is positioned under the first outlet 25 and the opening 61 of the second line 20 is positioned under the second outlet 32. This positioning is performed when the stall 2 is in the position of the stall denoted 18 in FIG. 1.

In operation the embodiment shown in FIG. 3 functions in the same way as the embodiment shown in FIG. 2. In case the computer 23, from the measurement with the testing sensor 22, determines that the quality of the milk is good the first outlet valve 24 is opened, while if the quality of the milk is not good the second outlet valve 31 is opened.

In the embodiments shown in FIGS. 2 and 3 there may be a local milk tank 4 for each separate teat, with a separate conduit from each one of the local milk tanks 4 to a respective teatcup 8. In each local milk tank 4 is a sensor 22 arranged for testing the quality of the milk. By having a local milk tank 4 for each teatcup 8 the milk that has to be wasted may be minimised as an infection in only one teat leads to the disposal of the milk from only that teat.

Figure 4:
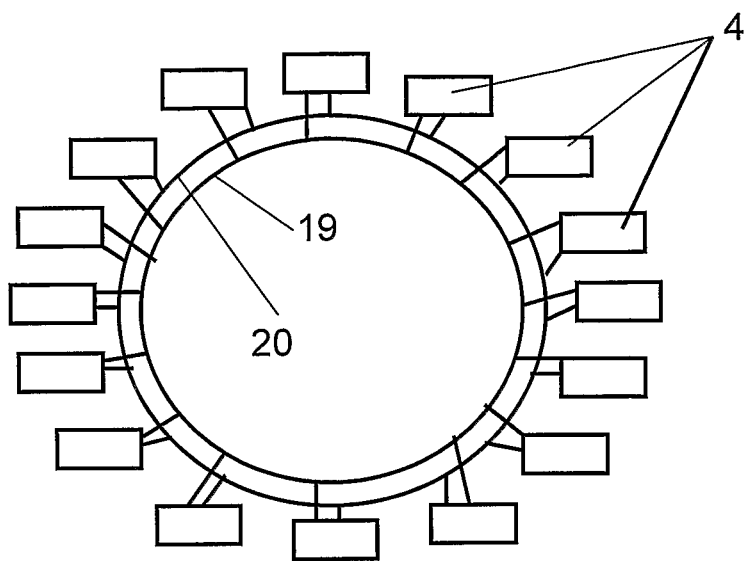
FIG. 4 shows schematically the arrangement of the local milk tanks when the lines are arranged annularly around the apparatus.

In FIG. 4 the local milk tanks 4 in the stalls 2 in an apparatus 1 according to another embodiment of the present invention are shown. The local milk tanks 4 are all connected to the first line 19 and the second line 20 all the time.

Figure 5:
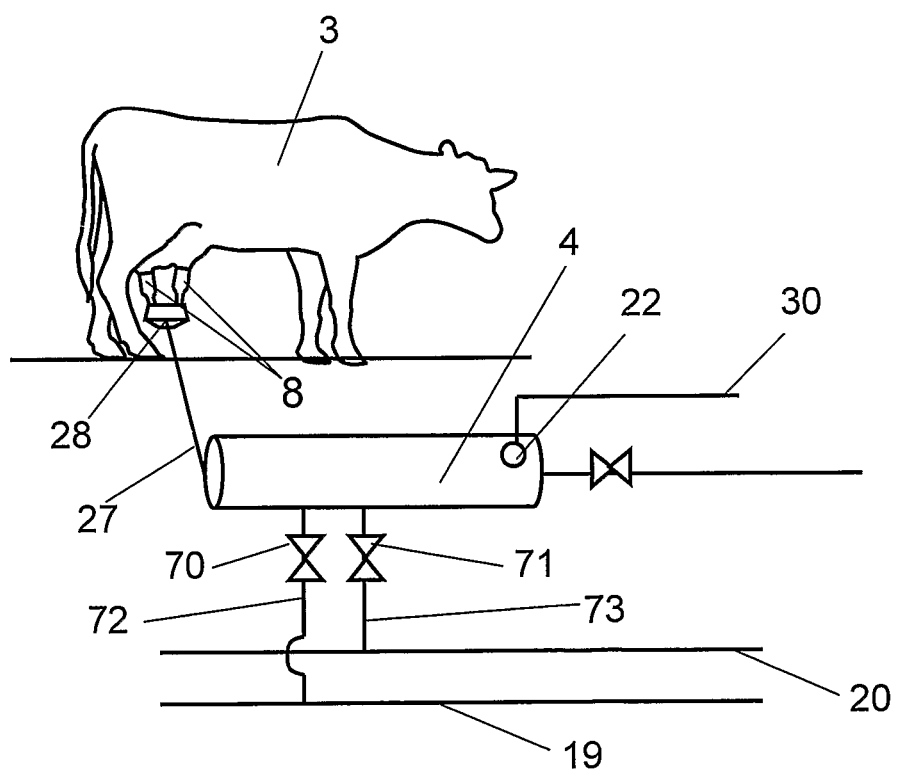
FIG. 5 shows a side view of a stall arranged for the apparatus according to FIG. 4.

FIG. 5 shows schematically a side view of one of the stalls in an apparatus according to the embodiment shown in FIG. 4. Only the parts in FIG. 4 that differs from the parts in FIGS. 2 and 3 will be described. The local milk tank 4 is connected to a first line 19 via a first connection valve 70 and a first subconduit 72 and to a second line 20 via a second connection valve 71 and a second subconduit 73.

In operation of an apparatus according to the embodiment of FIG. 4 and FIG. 5 the animal in the stall 2 is milked and the milk is tested in the same way as in the embodiments described in relation to FIG. 2 and FIG. 3. In case the milk is of good quality the first connection valve 70 is opened and in case the milk is not of good quality the second connection valve 71 is opened.

Figure 6:
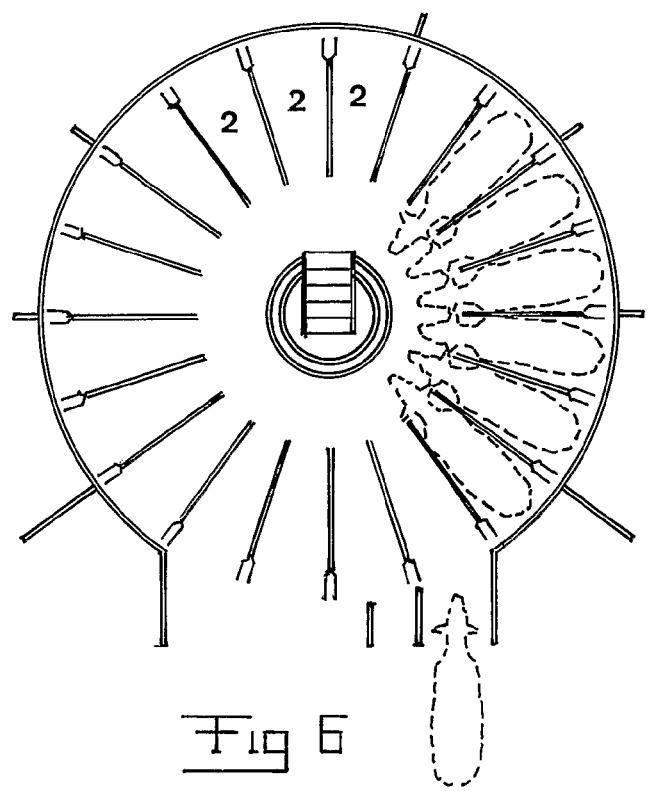
FIG. 6 shows schematically an apparatus, according to a second embodiment of the present invention, arranged for milking cows.

FIG. 6 shows schematically an apparatus according to a further embodiment of the present invention. The apparatus in FIG. 6 differs from the apparatus shown in FIG. 1 in that the stalls 2 are arranged differently in FIG. 6.

Figure 7:
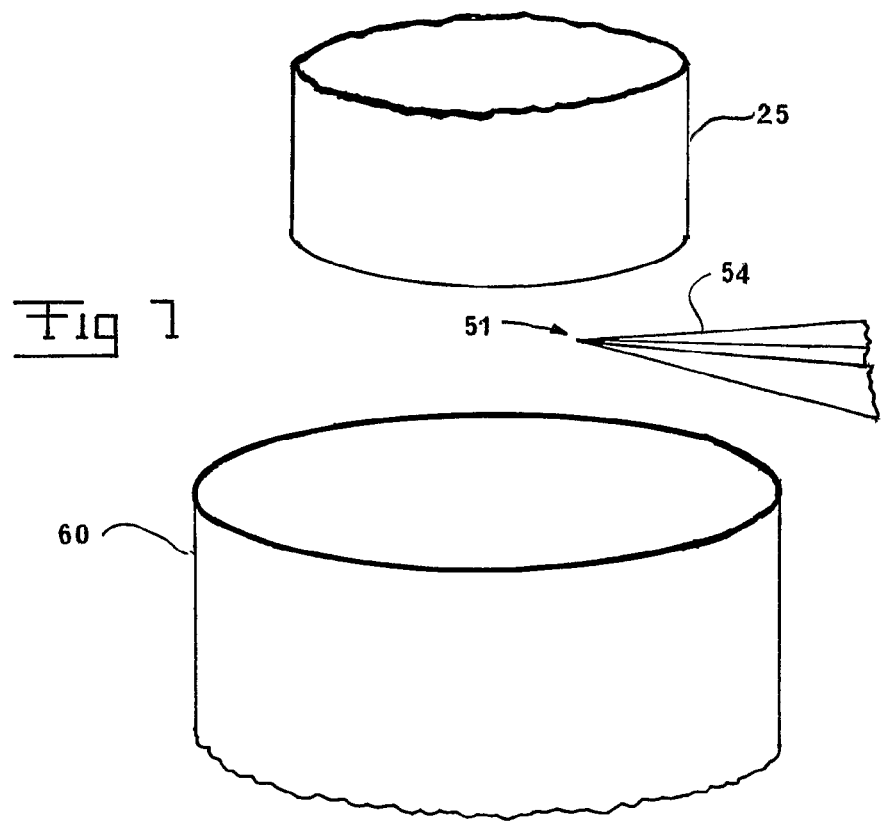
FIG. 7 shows a sampling device arranged at the outlet from the local milk tank.

FIG. 7 shows in more detail the collection device in FIG. 2 arranged between the outlet 25 and the opening 60 of the first conduit 19. The opening 60 of the first conduit has a larger cross section than the outlet 25 in order to easily collect the milk from the outlet 25. The collection device 51 has the form of a point with a channel 54. The sampling conduit 52 is connected to the collection device 51.

During operation when milk is flowing from the outlet 25 to the first line 19 a small portion of the milk hits the collection device 51, and flows along the channel 54.

The invention is not limited to the above described embodiments, but may be modified in numerous ways without departing from the spirit and scope of the invention which is limited only by the claims.

It is possible to have the plurality of stalls which are annularly arranged in a rotatable arrangement, arranged differently from the embodiments described above.

It is possible within the scope of the claims to have more than two lines 18, 19 to receive the milk from the local milk tanks 4. It is possible to have a third line for receiving milk from the local milk tanks 4, which third line is connected to, e.g., a milk tank for feeding calves.

The translation device arranged for moving the outlet may have any other form known to the mankind. Examples of other translation devices are mechanical arrangements utilising electric motors, linear electric motors and hydraulic cylinders.

It is of course possible to arrange a sampling device also in the embodiments of FIGS. 3, 4 and 6.

The invention claimed is:
1. Apparatus for milking of animals which are permitted to go loose, comprising:
  a plurality of stalls, in which the animals are to be milked, wherein said stalls are annularly arranged in a rotatable arrangement, wherein each stall comprises teatcups to be applied to the teats of an animal present in the stall, and at least one local milk tank connected to the teatcups via a respective milk conduit;

a testing device arranged to test the quality of the milk to be contained in each local milk tank; and at least two separate lines arranged to receive the milk from each local milk tank, wherein each local milk tank is arrangable for transfers of the milk to one of the lines in dependence of the quality of the milk, wherein each local milk tank has at least one outlet provided with at least one outlet valve, wherein each one of the separate lines has an opening for receiving milk from said at least one outlet, wherein said at least one outlet from each said at least one local milk tank is arranged to be positioned at one of the openings, when milk is to be transferred from the local milk tank, and wherein the testing device is arranged to test the milk on its way from the teatcups to the local milk tank.

2. Apparatus according to claim 1, wherein each local milk tank has an outlet with an outlet valve corresponding to each one of the openings, wherein the apparatus is arranged to position the outlets from each local milk tank at the corresponding openings when milk is to be transferred from the local milk tank, and to open the outlet valve corresponding to the opening to which the milk is to be transferred.

3. Apparatus according to claim 2, wherein a sampling device is arranged to take a sample of the milk from each local milk tank as it enters one of the lines, wherein the sample is representative of the milk in the local milk tank.

4. Apparatus according to claim 2, wherein a robot is arranged to position the teatcups on the animals in the stalls.

5. Apparatus according to claim 1, wherein said at least one outlet from each local milk tank is movable in relation to the local milk tanks to choose to which one of the openings the milk is to be transferred.

6. Apparatus according to claim 1, wherein the openings are movable to choose to which one of the openings the milk is to be transferred.

7. Apparatus according to claim 1, wherein at least a first line of the lines is connected to all of the local milk tanks via a connection valve between the local milk tank and the first line and wherein the local milk tank is arrangable for transfer of the milk to the first line by opening the connection valve between the local milk tank and the first line.

8. Apparatus according to claim 7, wherein at least one of the lines is an annular line which extends to the vicinity of all the stalls.

9. Apparatus according to claim 7, wherein all the lines are connected to all of the local milk tanks.

10. Apparatus according to claim 7, wherein a sampling device is arranged to take a sample of the milk from each local milk tank as it enters one of the lines, wherein the sample is representative of the milk in the local milk tank.

11. Apparatus according to claim 7, wherein a robot is arranged to position the teatcups on the animals in the stalls.

12. Apparatus according to claim 1, wherein a sampling device is arranged to take a sample of the milk from each local milk tank as it enters one of the lines, wherein the sample is representative of the milk in the local milk tank.

13. Apparatus according to claim 12, wherein the sample device comprises a collection device which may be positioned in a flow of milk from the local milk tank as the milk from the local milk tank is transferred to one of the lines.

14. Apparatus according to claim 1, wherein a robot is arranged to position the teatcups on the animals in the stalls.

15. Apparatus for milking of animals which are permitted to go loose, comprising:

a plurality of stalls, in which the animals are to be milked, wherein said stalls are annularly arranged in a rotatable arrangement, wherein each stall comprises teatcups to be applied to the teats of an animal present in the stall, and at least one local milk tank connected to the teatcups via a respective milk conduit;

a testing device arranged to test the quality of the milk to be contained in each local milk tank; and at least two separate lines arranged to receive the milk from each local milk tank, wherein each local milk tank is arrangable for transfers of the milk to one of the lines in dependence of the quality of the milk, wherein each local milk tank has at least one outlet provided with at least one outlet valve, wherein each one of the separate lines has an opening for receiving milk from said at least one outlet, wherein said at least one outlet from each said at least one local milk tank is arranged to be positioned at one of the openings, when milk is to be transferred from the local milk tank, and wherein the testing device is arranged to test the milk in the local milk tank.

* * * * *